United States Patent [19]
Seidl et al.

[11] Patent Number: 6,079,893
[45] Date of Patent: Jun. 27, 2000

[54] CONNECTION BETWEEN THE SPINDLE HEAD OF A GEAR-TYPE OR UNIVERSAL JOINT SPINDLE AND A ROLL NECK

[75] Inventors: Karl-Heinz Seidl, Hilchenbach; Hans-Joachim Marburger, Erndtebrück, both of Germany

[73] Assignee: SMS Schloemann-Siemag Aktiengesellschaft, Düsseldorf, Germany

[21] Appl. No.: 09/041,205

[22] Filed: Mar. 12, 1998

[30] Foreign Application Priority Data

Mar. 14, 1997 [DE] Germany .......................... 197 10 552

[51] Int. Cl.[7] ...................................................... F16D 1/00
[52] U.S. Cl. ............................. 403/15; 403/31; 403/373; 464/901; 464/182
[58] Field of Search ................................ 403/31, 15, 362, 403/322.1, 322.3, 373; 403/324; 464/182, 37, 113, 901

[56] References Cited

U.S. PATENT DOCUMENTS

| | | |
|---|---|---|
| 4,136,533 | 1/1979 | Okuda .......................................... 64/23 |
| 4,264,229 | 4/1981 | Falk et al. .................................. 403/31 |
| 4,512,678 | 4/1985 | Bunker et al. ............................. 403/15 |
| 4,752,275 | 6/1988 | Lindenthal et al. ...................... 403/32 |
| 5,051,018 | 9/1991 | Appell et al. ............................... 403/5 |
| 5,201,842 | 4/1993 | Elsner ........................................ 403/31 |
| 5,435,577 | 7/1995 | Bauer et al. ............................... 403/31 |

OTHER PUBLICATIONS

Patent Abstracts of Japan, vol. 95, No. 4, May 31, 1995 & JP 07 016623 A (Kawasaki Steel Corp), Jan. 20, 1995.

*Primary Examiner*—Terry Lee Melius
*Assistant Examiner*—Kenneth Thompson
*Attorney, Agent, or Firm*—Friedrich Kueffner

[57] ABSTRACT

A connection between the spindle head of a gear-type or universal joint spindle and the neck of a roll includes wear plates are placed between locating surfaces on the spindle head and on the roll neck so as to primarily produce a positive engagement. The spindle head is provided with a clamping device for applying pressure to the wear plates and for clamping the spindle head on the roll neck for constructing the positively engaging connection as a play-free connection.

5 Claims, 2 Drawing Sheets

CONNECTION BETWEEN THE SPINDLE HEAD OF A GEAR-TYPE OR UNIVERSAL JOINT SPINDLE AND A ROLL NECK

BACKGROUND OF THE INVENTION

1. Field of the Invention

The present invention relates to a connection between the spindle head of a gear-type or universal joint spindle and the neck of a roll, wherein wear plates are placed between locating surfaces on the spindle head and on the roll neck so as to primarily produce a positive engagement.

2. Description of the Related Art

In accordance with the prior art, the spindle head is usually placed on the roll neck with play in a positively engaging or locking manner. In practice, this type of connection between the spindle head and the roll neck has been found to be disadvantageous especially in skin pass stands. When high and non-uniform torques are transmitted, the play of the fit causes relative movements between the spindle head and the roll neck which leads to a rapid wear of the wear plates manufactured of bronze material. Moreover, this play results in variations of the transmitted torque which may lead to damage of the gears of the drive system and to defects in the surface of the rolled material.

SUMMARY OF THE INVENTION

Therefore, it is the primary object of the present invention to further develop and improve the connection of the type described above in such a way that the difficulties and disadvantages described above are avoided, and particularly to significantly reduce the wear of the wear plates, to avoid non-uniform torques and, thus, to optimize the operating conditions of the torque transmission.

In accordance with the present invention, the spindle head is provided with a clamping device for applying pressure to the wear plates and for clamping the spindle head on the roll neck for constructing the positively engaging connection as a play-free connection.

The present invention provides the significant advantage that the clamping device provided in addition to the positively engaging connection eliminates the disadvantageous coupling play and facilitates a rotation of the driven roll which is free of non-uniform torque peaks. This optimizes the entire operating conditions of the torque transmission and reduces the susceptibility of the drive elements to wear and problems, and the surface quality of the rolled product is improved.

In accordance with a further development of the present invention, the clamping force produces a play-free mounting of the spindle head on the roll neck and, thus, a frictional engagement between the spindle head and the roll neck.

The configuration according to the present invention completely eliminates the above-mentioned disadvantages and problem factors of the prior art.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
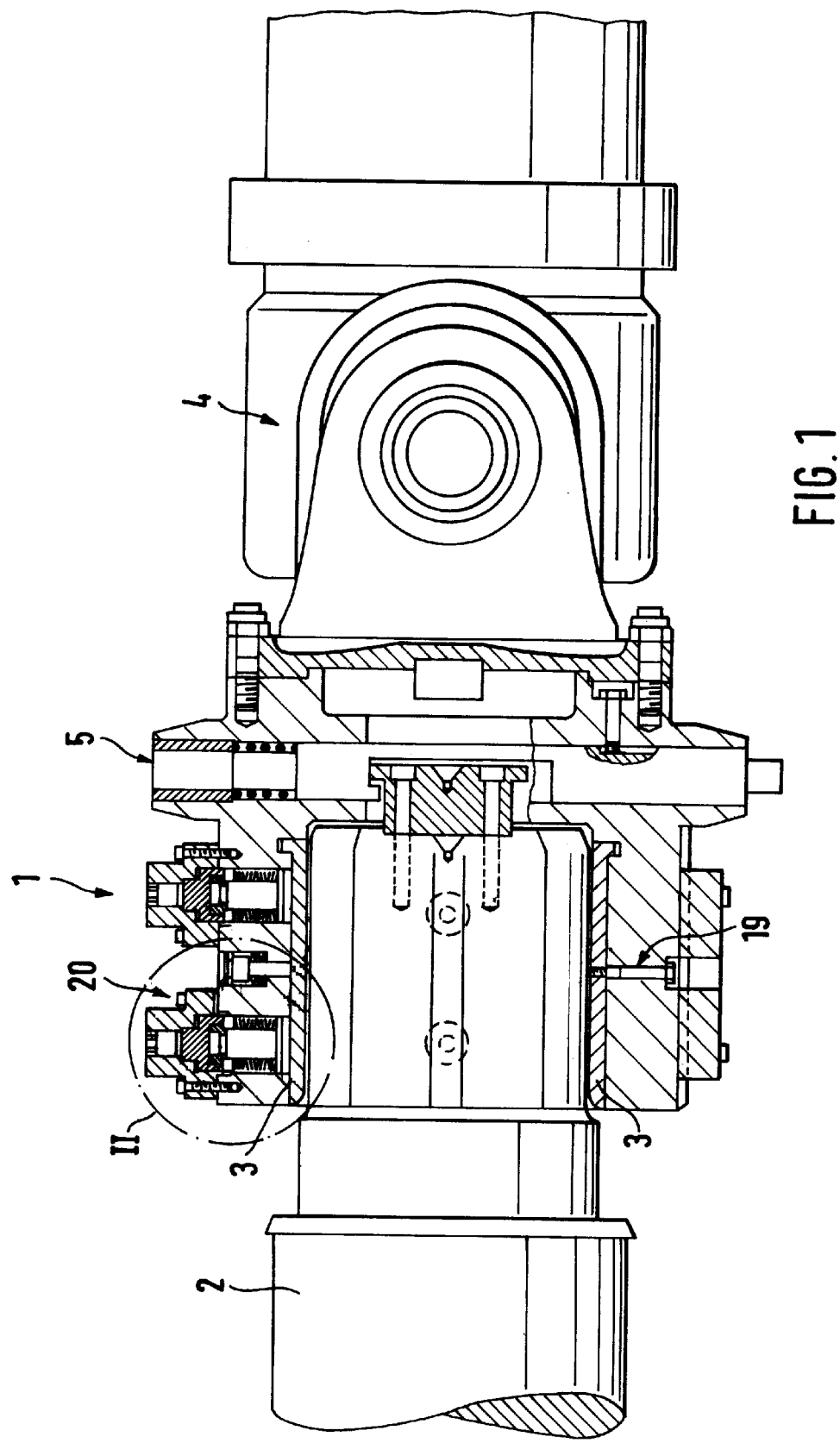
FIG. 1 is an elevational view, partially in section, showing a connection between the spindle head of a universal joint spindle and the neck of a roll.

FIG. 1 shows a connection between the spindle head 1 of a universal joint spindle 4 and the neck 2 of a roll, wherein wear plates 3 are placed between the torque-transmitting locating surfaces of the spindle head 1 and the roll neck 2 so as to form a positive engagement. The spindle head 1 is provided with a clamping device 20 which applies pressure to the wear plates 3 and clamps the spindle head 1 on the roll neck 2 in order to construct the positively engaging connection as a play-free connection.

The connection according to the present invention is particularly advantageous because the clamping force of the clamping device 20 produces a play-free mounting of the spindle head 1 on the roll neck 2 and, thus, results in a frictional engagement between the spindle head 1 and the roll neck 2.

The connection further includes at least one locking screw 19 and a safety bolt 5 interacting with the roll neck 2.

Figure 2:
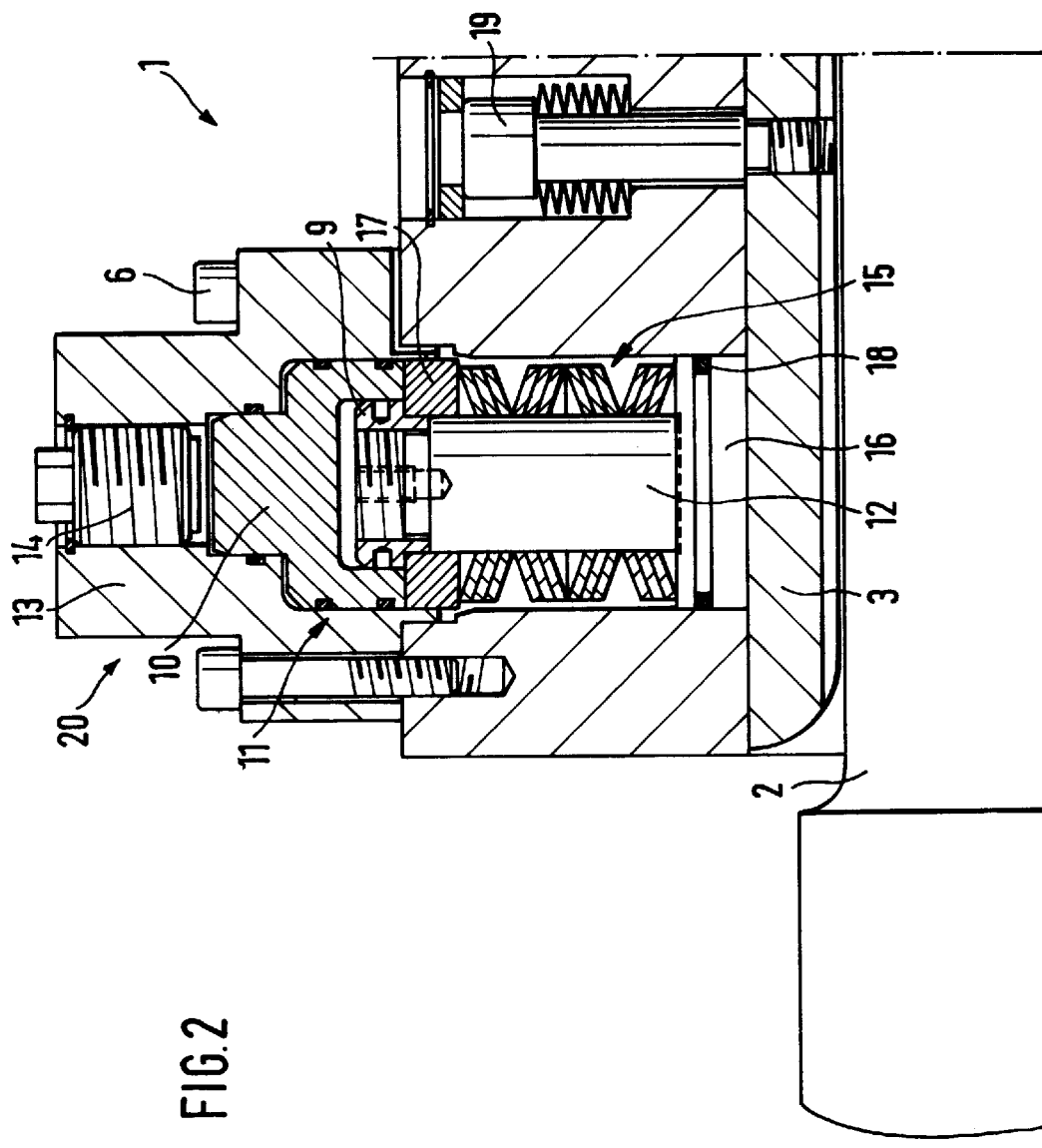
FIG. 2 is a sectional view, on a larger scale, of a clamping device.

The clamping device 20 indicated in FIG. 1 by a dash-dot circle is shown in FIG. 2 on a larger scale and in a partial view.

As can be seen in FIG. 2, the clamping device 20 includes at least one bolt 12, which rests in a frictionally engaging manner against the wear plates 3, wherein pressure is applied to the bolt 12 by the piston 10 of a hydraulic tensioning cylinder 11. A locking screw 14 received in the housing 13 of the tensioning cylinder 11 acts on and serves to secure the piston 10.

The configuration of the clamping device 20 according to the present invention serves to clamp the spindle head 1 with high force against the roll neck 2, initially with the hydraulic medium by applying pressure to the piston 10 in the hydraulic tensioning cylinder 11. Work pressures of between 500 and 750 bars are usually applied. In the illustrated embodiment of the hydraulic piston/cylinder unit, each tensioning cylinder reaches pressures in the order of magnitude of 30 tons. For example, when the clamping device 20 is mounted on the spindle head 1 in the manner illustrated in FIG. 1, clamping pressures of 2×30=60 tons are applied. After the bolt 12 has been subjected to the hydraulic medium, the bolt 12 is finally secured by placing and screwing in the locking screw 14.

The configuration of the clamping device according to FIG. 2 shows that the bolt 12 and the piston 10 of the tensioning cylinder 11 are acted upon by a cup spring bundle 15 with restoring force. In accordance with an advantageous feature of this embodiment, a pressure distribution plate 16 is placed under the bolt 12 at the end facing the wear plate 3. In addition, a massive or solid disk 17 surrounds the head of the bolt 12 and the disk 17 is held by a tensioning nut 9 against the restoring force of the cup spring bundle 15 mounted between the disk 17 and the pressure distribution plate 16. The pressure distribution plate 16 has a groove and an O-ring placed in the groove. The tensioning nut 9 is screwed onto a threaded projection at the head of the bolt 12. This results in a very compact hydraulic unit of the clamping device 20. The spindle head 1 further includes a locking screw 19 interacting with the wear plate 3 and a safety bolt 5 interacting with the roll neck 2, as shown in FIG. 1.

Finally, in accordance with a characteristic feature of the connection with the clamping device 20, the housing 13 of the hydraulic tensioning cylinder 11 is connected to the spindle head 1 by means of screws 6. This configuration provides the advantageous possibility of retrofitting an existing spindle head 1 with the clamping device 20, if necessary.

The connection according to the present invention is uncomplicated and makes it possible in an advantageous manner, if necessary by retrofitting existing plants, to provide a play-free construction of a connection between the spindle head 1, a gear-type or universal joint spindle 4 and the neck 2 of a roll, while avoiding the weak points that have been found in the prior art. Accordingly, the invention meets the above-described object in an optimum manner.

While specific embodiments of the invention have been shown and described in detail to illustrate the inventive principles, it will be understood that the invention may be embodied otherwise without departing from such principles.

What is claimed is:

1. A connection between a spindle head of a gear spindle or universal joint spindle and a neck of a roll, comprising wear plates placed between torque-transmitting locating surfaces of the spindle head and the roll neck so as to form a positively engaging connection, the spindle head comprising a clamping device for applying pressure to the wear plates and for clamping the spindle head onto the roll neck, wherein the clamping device is mounted such that a clamping force of the clamping device results in a play-free frictionally engaging connection between the spindle and the roll neck, wherein the clamping device comprises at least one bolt resting in a frictionally engaging manner against the wear plates, and a piston of a hydraulic tensioning cylinder for applying pressure to the bolt, further comprising a locking screw received in a housing of the tensioning cylinder for securing the piston, further comprising a cup spring bundle for acting with restoring force on the bolt and the piston of the tensioning cylinder, further comprising a pressure-distribution plate placed underneath the bolt at an end thereof facing the wear plate, a solid disk surrounding a head of the bolt, and a tensioning nut for holding the solid disk against a restoring force of a cup spring bundle mounted between the disk and the pressure distribution plate.

2. The connection according to claim 1, wherein the pressure distribution plate comprises a groove and an O-ring placed in the groove.

3. The connection according to claim 1, wherein the tensioning nut is screwed onto a threaded projection on the head of the bolt.

4. The connection according to claim 1, wherein the spindle head comprises a locking screw for acting on the wear plate and a safety bolt for acting on the roll neck.

5. The connection according to claim 1, comprising screws connecting the housing of the hydraulic tensioning cylinder to the spindle head.

* * * * *